No. 848,292. PATENTED MAR. 26, 1907.
C. E. DAWSON.
AUTOMATIC SPEED CONTROLLED CIRCUIT CLOSURE FOR ELECTRIC GENERATORS.
APPLICATION FILED AUG. 11, 1906.
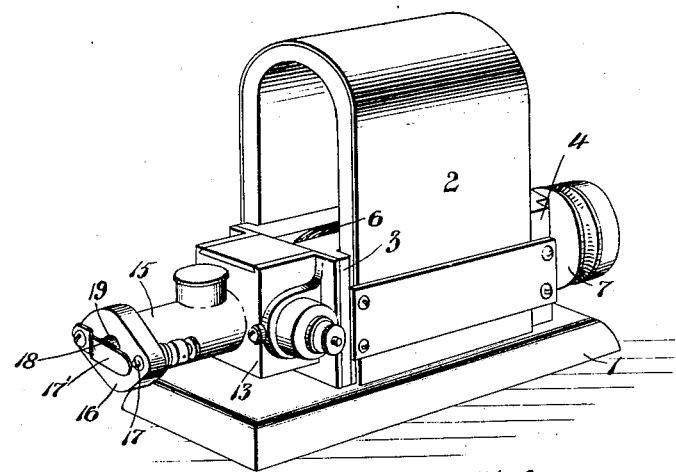
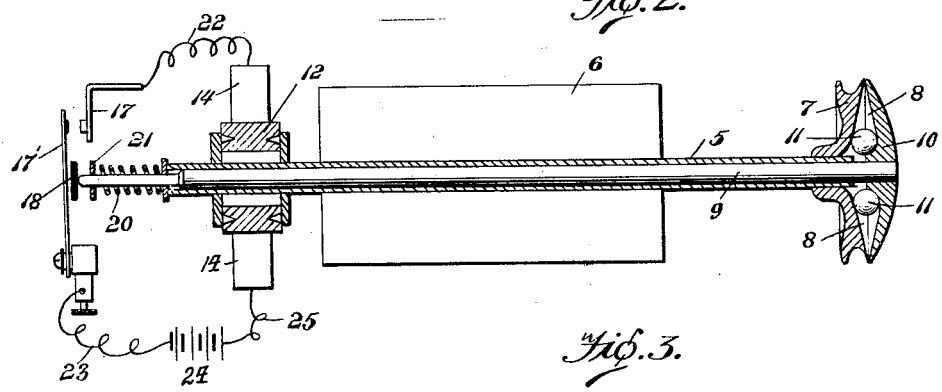
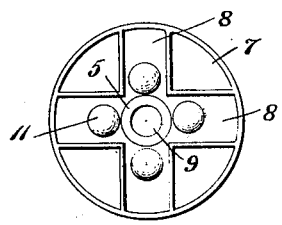

UNITED STATES PATENT OFFICE.

CHARLES ERNEST DAWSON, OF INDIANAPOLIS, INDIANA, ASSIGNOR TO ARTEMUS W. FISHER, OF SOUTH BEND, INDIANA.

AUTOMATIC SPEED-CONTROLLED CIRCUIT-CLOSURE FOR ELECTRIC GENERATORS.

No. 848,292.     Specification of Letters Patent.     Patented March 26, 1907.

Application filed August 11, 1906. Serial No. 330,253.

*To all whom it may concern:*

Be it known that I, CHARLES ERNEST DAWSON, residing at Indianapolis, in the county of Marion and State of Indiana, have invented new and useful Improvements in Automatic Speed-Controlled Circuit-Closures for Electric Generators, of which the following is a specification.

This invention relates to speed-controlled circuit-closures for electric generators.

An object of the invention is to provide a mechanism which will permit an electric generator to automatically maintain the electric charge of an accumulator battery, particularly a battery used for the igniting apparatus of an internal-combustion motor.

The invention is also applicable for charging any secondary battery in which the motive power used to operate the generator is irregular.

Other and further objects of the invention will appear in the following description and will be more particularly pointed out in the appended claims.

In the drawings, Figure 1 is a perspective view of my invention. Fig. 2 is a horizontal sectional view in a plane through the armature-shaft, showing the circuit to the storage batteries; and Fig. 3 is a detail view of the governor.

Referring more particularly to the drawings, 1 indicates a base, and 2 a permanent magnet of the horseshoe formation secured upon the base in an inverted position. At the opposite sides of the magnet are arranged bearing-blocks 3 and 4 for the hollow shaft 5 of an armature 6.

Upon one end of the hollow shaft 5 is mounted a peripherally-grooved pulley or disk 7, which is connected by a belt or other transmission device to an internal-combustion motor or irregular motive power. The outer face of the pulley is provided with a plurality of radial grooves 8, which decrease in depth from the axis of the pulley toward the periphery.

Extending through the hollow shaft 5 is a spindle 9, the end of which that is adjacent the pulley 7 being provided with a disk 10. The face of the disk 10 opposed to the grooved face of the pulley is provided with a like number of radial grooves 8 of like formation, the opposed grooves forming tapering radial raceways between the two parts.

In these raceways are located balls 11, which when the armature-shaft is driven at a certain predetermined speed fly by centrifugal force toward the peripheries of the pulley and the disk 10 and cause the disk 10 to move axially away from the pulley. As the disk 10 is rigidly secured to the spindle 9, the spindle 9 also moves axially, the purpose of which will be hereinafter described.

Upon the side of the magnet 2 opposite the drive-pulley 7 of the centrifugal governor a commutator 12 is mounted on the shaft 5. This commutator may be of any suitable form and is inclosed by a housing 13, which supports the brushes 14.

Projecting from the housing 13 is a tubular housing 15, which is made of insulating material and surrounds the projecting ends of the shaft 5 and of the spindle 9. The free end of the housing 15 is closed by a disk 16, the edges of which project beyond the circumference of the said housing and have secured thereto a pair of contacts 17 and 17', the latter being in the form of a spring and normally tending to move toward the former.

The under face of the contact 17' is provided with a piece of insulation 18, which lies directly in front of an opening 19 in disk 16 and which is adapted to be engaged by the end of the spindle 9 projecting through the opening 19. To normally hold the end of the spindle 9 against the insulation 18, I provide means in the form of a helical spring 20, inclosed within the housing 15 and having one end abutting the end of the hollow shaft 5 and the other end abutting a collar 21 on the spindle.

The contact 17 is connected by a conductor 22 directly with one of the brushes 14, while the contact 17 is connected by a conductor 23 with storage batteries 24, which are in turn connected by a conductor 25 with the other brush 14.

It will be noted that the spindle 9 is normally held by the spring 20 in such a position as to provide an open circuit through the storage batteries 24. When the speed of the generator increases to such an extent that the voltage has reached a predetermined point, the centrifugal governor draws the spindle 9 away from the circuit-closer 17', permitting the latter to move to contact 17 and to make a circuit from the generator through the storage batteries, and when the voltage falls below the predetermined point the governor will permit spindle 9 to move and break the circuit. Thus it will be seen that when the irregular power is running at high speed the storage batteries are charged and when said power is running at low speed the generator does not charge the batteries. By this means it is impossible for the batteries to discharge through the generator, as at no time when the circuit is closed does the electromotive force of the generator fall below that of the batteries.

A further advantage of this invention is the fact that the circuit is completed and broken mechanically instead of electrically.

Having thus described my invention, what I claim, and desire to secure by Letters Patent, is—

1. The combination of the generator having a hollow armature-shaft, a centrifugal governor on said shaft, a spindle extending through said shaft and moved by the governor, and a circuit-closer in circuit with the generator, and operated by the spindle.

2. The combination of the generator having a hollow armature-shaft, a centrifugal governor on said shaft, a spindle extending through the shaft and moved by the governor in one direction, a spring moving the spindle in the other direction, and a circuit-closer normally held open by the spindle.

3. The combination of a base of a permanent magnet of horseshoe formation secured to the base, bearing-blocks arranged at opposite sides of the magnet, an armature having a hollow shaft, journaled in the bearing-blocks, a governor at one end of the shaft, a circuit-closer at the other end of the shaft, and a spindle extending through the shaft, and moved by the governor to move the circuit-closer.

In testimony whereof I affix my signature in presence of two subscribing witnesses.

CHARLES ERNEST DAWSON.

Witnesses:
  CHAS. H. SCHOLL,
  J. W. MALIN.